F. D. CARRICO.
STEERING GEAR.
APPLICATION FILED MAR. 9, 1914.

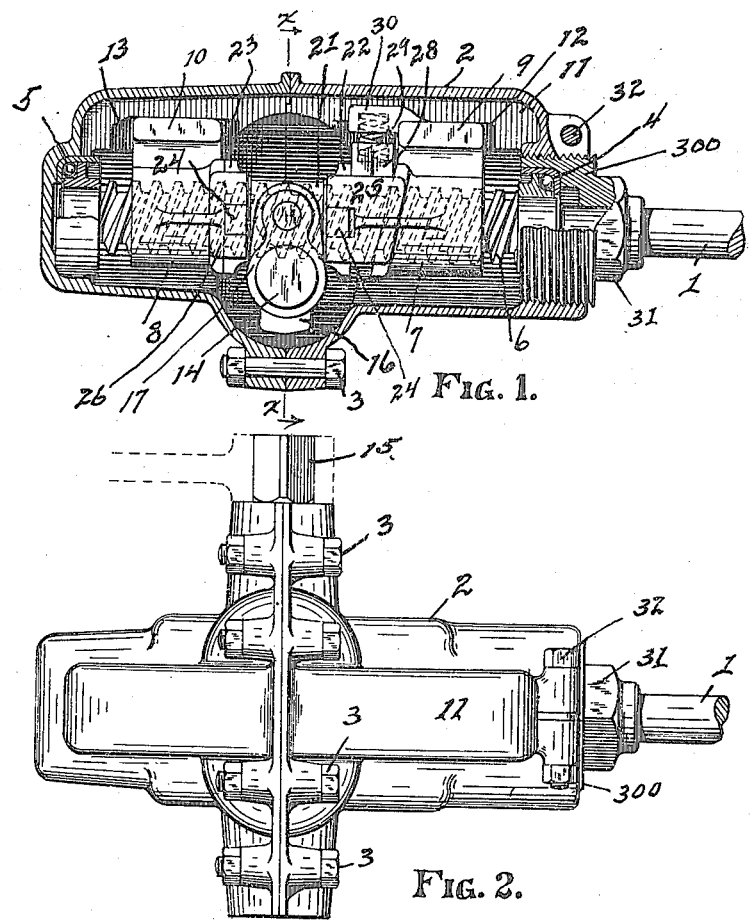

1,123,483.

Patented Jan. 5, 1915.
2 SHEETS—SHEET 2.

WITNESSES:
Richard Alspas.
Selene Mc Donald

INVENTOR.
FRANK D. CARRICO
BY
Charles E. Wiener
ATTORNEY.

UNITED STATES PATENT OFFICE.

FRANK D. CARRICO, OF HAMTRAMCK, MICHIGAN, ASSIGNOR TO MOTOR APPLIANCE SALES COMPANY, LTD., OF DETROIT, MICHIGAN, A COPARTNERSHIP COMPOSED OF JOHN F. McLAUGHLIN, GABRIEL H. KARCOFE, JAMES H. ULRICH, FRANK D. CARRICO, GRANT S. CARROLL, AND JOHN ANDERSON.

STEERING-GEAR.

1,123,483. Specification of Letters Patent. Patented Jan. 5, 1915.

Application filed March 9, 1914. Serial No. 823,317.

*To all whom it may concern:*

Be it known that I, FRANK D. CARRICO, a citizen of the United States, residing at Hamtramck, county of Wayne, State of Michigan, have invented a certain new and useful Improvement in Steering-Gear, and declare the following to be a full, clear, and exact description of the same, such as will enable others skilled in the art to which it pertains to make and use the same, reference being had to the accompanying drawings, which form a part of this specification.

This invention relates to steering gears of the worm and traveling nut type for motor vehicles, and its object is a steering gear in which wear is reduced to a minimum, and in which no lost motion may occur between the steering wheel and steering arm operated thereby due to such wear, the principal object being an improved design and arrangement of parts to such end.

A further object is a steering gear that is not only highly efficient in operation but one in which the cost of manufacture is reduced to a minimum.

These and other objects and novel features of construction are hereinafter more fully described and claimed, and shown in the accompanying drawings in which—

Figure 4:
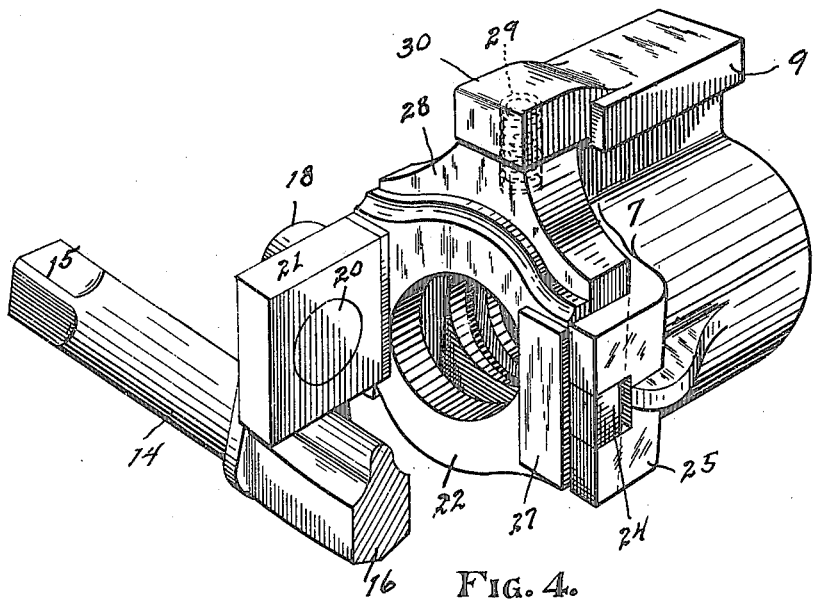
Figure 3:
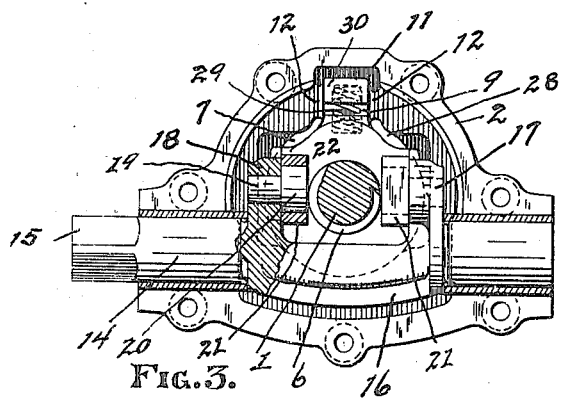

Figure 1 is an elevation partly in section of a steering gear embodying my invention. Fig. 2 is a plan view thereof. Fig. 3 is a cross-section on line x—x of Fig. 1. Fig. 4 is a detail in perspective of one of the traveling nuts through movement of which the steering arm is actuated.

Similar characters refer to similar parts throughout the drawings and specification.

1 indicates the lower end of the steering rod to the upper end of which is attached a steering wheel (not shown). The shaft 1 is rotatably mounted in a case 2 formed of two parts, secured together by the bolts 3, 3 etc. Ball-bearings 4 and 5 are provided for the shaft at each end of the case whereby friction is reduced to a minimum. Within the case the shaft 1 is provided with screw threads 6 on which are mounted the nuts 7 and 8 adapted to jointly move longitudinally of the shaft 1 upon a rotation thereof in either direction. In order that these nuts may not turn with the shaft each are provided upon the upper side with a rib 9 and 10 respectively, extending into a channel 11 formed in the upper part of the case. The case is formed with finished surfaces 12 and 13 engaged by the ribs 9 and 10 respectively. There are two finished surfaces 12, as is shown in Fig. 3, engaging each side of the rib on the nut 7 and likewise two finished surfaces 13 for the rib on the nut 8, and both nuts are thus held from rotative movement. Any rotation of the steering shaft 1, therefore, is wholly converted into a longitudinal movement of the nuts on the shaft, and no lost motion between the shaft 1 and steering arm may occur.

A rock shaft 14 is carried in the case at right angles to the steering shaft, and one end 15 of the rock shaft projects from the case and is preferably squared as shown in Fig. 2, on which squared end is secured the usual rock arm indicated by dotted lines connected with the steering knuckles in any approved manner. As is shown more clearly in Figs. 3 and 4 the rock-shaft is formed with a yoke 16 having arms 17 and 18 preferably integral therewith. In each arm is secured a pin 19 having a round head 20, on which is mounted a square block 21 in each instance. The head 19 is rotatable in the block and the block is engaged by the traveling nuts, in a manner hereinafter described, so that movement of the nuts longitudinally of the shaft 1 rocks the shaft 14 to operate the rock-arm in the usual manner. As is shown more fully in Figs. 1 and 4, each nut is provided with a shoe 22 and 23 respectively, which is hardened, as is also the blocks 21 engaging therewith, and each shoe is provided with a lug 24 on each side engaging in a slot in an extension 25 or 26 of each nut respectively. Each shoe is provided with a raised finished part as shown at 27, in Fig. 4, for engagement with the blocks 21.

The extensions 25 on the nut 7 are greater in length than the similar extensions 26 on the nut 8, and between the shoe 2 carried by these extensions 25 and the nut 7 is a U shaped wedge plate 28. The wedge plate extends each side of the shaft 1 and is provided with a recess on the upper end in which is positioned a coiled spring 29. The upper end of the spring engages in a similar recess in the arm 30 on the nut 7 extending over the wedge plate 28 as is shown more clearly in Fig. 4. The spring acts to force the wedge plate downward between the shoe 22 and face of the nut, and thus takes up all wear that may occur between the shoes and the block 21. Should wear occur for any reason the blocks and shoes, or either, may be readily removed and new ones inserted. Under all ordinary conditions, however, the wedge plate 28 acts to take up all wear and thus no lost motion between the shaft 1 and steering arm may occur. When the gear is once properly assembled no adjustments are required to maintain the parts in their proper relation. By forming the yoke 16, arms 17 and 18 and rock shaft 14 of one piece, the cost of assembling is materially reduced, and by providing each of the nuts with a rib engaging in a channel formed in the casing, the area of the surfaces in frictional contact are reduced to a minimum.

As may be seen more clearly in Figs. 1 and 2, the case 2 is formed of two separable parts, the meeting faces of which are parallel with the longitudinal axis of the rock-shaft 14. The meeting faces of the two parts are machined and one part provided with a shoulder engaging in a similarly shaped recess formed in the other part, thus providing a tight joint and the case may be filled with lubricant as no leakage may occur. One end of the case is provided with an apertured plug 300 exteriorly threaded for insertion in a like threaded aperture in the case end. This plug is recessed to receive the cone for the ball-bearing 4 and centrally apertured through which passes the steering shaft 1. A nut 31 integral with the plug is also provided by which the plug may be turned and the shaft may thus at all times be held from longitudinal movement in the case by adjustment of the plug 300. The case is split at the end for a short distance and provided with a tightening bolt 32 to prevent accidental rotation of the plug 300.

From the foregoing description it is evident that the device is of simple construction and comparatively light in weight while sufficiently strong for its purpose, that little or no friction is developed in the operation of the parts, and that no lost motion may occur between the steering wheel and rock-arm through wear of the parts, and that the parts within the casing may be practically completely assembled in proper relation in one side of the casing, and the remaining part of the casing then readily positioned and secured in place by means of the bolts 3 or the like. The parts being thus readily assembled, expert workmanship is not required.

Having thus briefly described my invention, what I claim and desire to secure by Letters Patent of the United States is—

1. In a device of the character described, a casing, a screw-shaft therein, adjustable means at one end of the casing for holding the shaft from longitudinal movement therein, nuts on said shaft spaced one from the other, a rock-shaft mounted in the casing transversely of the screw-shaft, arms on said rock-shaft extending between adjacent faces of said nuts, blocks pivotally supported on said arms and engaging adjacent faces on the nuts, means for preventing rotation of the nuts, and a spring pressed wedge for taking up wear.

2. In a device of the character described, a casing, a screw-shaft therein, nuts on said shaft spaced one from the other, ribs on each of said nuts, a channel in said casing into which said ribs project whereby rotation of the nuts is prevented, a rock-shaft mounted in the casing transversely of the screw-shaft, hardened steel blocks pivotally mounted on said arms, hardened steel shoes mounted on adjacent faces of the nuts, a wedge member positioned between a shoe and face of one of the nuts, and a spring tending to force the wedge between the shoe and nut.

3. In a device of the character described, a casing, a screw-shaft mounted for rotation therein, adjustable means at one end of the casing for preventing longitudinal movement of the screw shaft, nuts on said screw-shaft spaced one from the other and having hardened shoes on adjacent faces, a rock-shaft mounted transversely of the screw-shaft having arms integrally formed therewith extending between the said shoes, blocks pivotally supported on said arms in engagement with said shoes, a wedge between the shoe and face of one of said nuts, an arm on said last mentioned nut extending over the wedge, a coil spring between the arm and the wedge, and means for preventing a rotation of the nuts.

4. In a device of the character described, a casing, a screw-shaft mounted for rotation therein, adjustable means for preventing movement of the screw-shaft longitudinally of the casing, nuts on said screw-shaft spaced one from the other, each of said nuts being provided with a rib, a channel in said casing in which said ribs ride longitudinally of the casing, and whereby rotation of the nuts is prevented, each of said nuts being further provided with slotted extensions each side of the screw-shaft, a hardened shoe for each nut having lugs engaging in said slots in the extensions, a rock shaft mounted transversely of the screw-shaft having arms extending between said shoes, blocks pivotally supported on said arms in engagement with each of said shoes, a wedge between one of said shoes and face of the supporting nut, an arm connected with said last mentioned nut extending over the wedge, and a coiled compression spring between the arm and the wedge.

5. In a device of the character described, a casing, a screw-shaft mounted for rotation therein, means for holding the shaft from movement longitudinally of the casing, nuts on said shaft spaced one from the other adapted for movement longitudinally of the casing and held from rotation with the screw-shaft, a rock-shaft mounted in the casing transversely of the screw-shaft, arms formed integrally with said rock-shaft extending between adjacent ends of said nuts, shoes supported by said nuts engaging said blocks, a U shaped wedge positioned about the screw-shaft between one of said shoes and the supporting nut, an arm on said last mentioned nut extending over the end of the wedge, said arm and said wedge being recessed, and a coiled spring engaging in said recesses.

In testimony whereof, I sign this specification in the presence of two witnesses.

FRANK D. CARRICO.

Witnesses:
JNO. H. ULRICH,
JOHN ANDERSON.

Copies of this patent may be obtained for five cents each, by addressing the "Commissioner of Patents, Washington, D. C."